US008488927B2

(12) United States Patent
Moison et al.

(10) Patent No.: US 8,488,927 B2
(45) Date of Patent: Jul. 16, 2013

(54) OPTICAL COMPONENT HAVING A WAVEGUIDE ARRAY HETEROSTRUCTURE

(75) Inventors: Jean-Marie Moison, Croissy-sur-Seine (FR); Christophe Minot, Paris (FR)

(73) Assignees: Centre National de la Recherche Scientifique (CNRS), Paris (FR); Groupe des Ecoles de Telecommunications—Ecole National Superieure des Telecommunications, Paris (FR)

( * ) Notice: Subject to any disclaimer, the term of this patent is extended or adjusted under 35 U.S.C. 154(b) by 215 days.

(21) Appl. No.: 13/120,661

(22) PCT Filed: Sep. 25, 2009

(86) PCT No.: PCT/FR2009/001142
§ 371 (c)(1), (2), (4) Date: Jul. 7, 2011

(87) PCT Pub. No.: WO2010/043777
PCT Pub. Date: Apr. 22, 2010

(65) Prior Publication Data
US 2011/0255821 A1 Oct. 20, 2011

(30) Foreign Application Priority Data
Sep. 26, 2008 (FR) .................................... 08 05307

(51) Int. Cl.
*G02B 6/42* (2006.01)

(52) U.S. Cl.
USPC .......................................................... 385/39

(58) Field of Classification Search
None
See application file for complete search history.

(56) References Cited

U.S. PATENT DOCUMENTS

2002/0131667 A1* 9/2002 Berini .............................. 385/11
2003/0169787 A1* 9/2003 Vurgaftman et al. ........... 372/20

OTHER PUBLICATIONS

SYMS RRA: "Approximate solution of eigenmode problems for layered coupled waveguide arrays"; IEEE Journal of Quantum Electronics USA, vol. QE-23, No. 5, May 1987, pp. 525-532.
Fleischer JW et al.; "Spatial photonics in nonlinear waveguide arrays"; Optics Express Opt. Soc. American USA; vol. 13, No. 6, Mar. 21, 2005.

* cited by examiner

*Primary Examiner* — Sung Pak
(74) *Attorney, Agent, or Firm* — Harness, Dickey & Pierce, P.L.C.

(57) ABSTRACT

The invention relates to an optical component including an array of coupled waveguides, wherein said waveguide array includes: a first area made of parallel waveguides coupled according to a first coupling coefficient; a second area adjacent to the first area and made of parallel waveguides coupled according to a second coupling coefficient lower than the first coupling coefficient; a third area adjacent to the second area and made of parallel waveguides coupled according to a third coupling coefficient higher than the second coupling coefficient; a fourth area adjacent to the third area and made of parallel waveguides coupled according to a fourth coupling coefficient lower than the third coupling coefficient; and a fifth area adjacent to the fourth area and made of parallel waveguides coupled according to a fifth coupling coefficient higher than the fourth coupling coefficient.

9 Claims, 9 Drawing Sheets

OPTICAL COMPONENT HAVING A WAVEGUIDE ARRAY HETEROSTRUCTURE

FIELD

The invention generally relates to an optical component comprising an array of coupled wave guides.

BACKGROUND

For example, such optical components comprising an array of coupled waveguides are described in publication "Spatial photonics in nonlinear waveguide arrays", Fleischer et al., Optics Express Vol. 13, No. 6, pp. 1780-1796 (2005). In this publication, the waveguides of the array are uniformly coupled in the array. The coupling uniformity within the array is obtained since two adjacent waveguides are coupled according to the same coupling coefficient within the array.

It is known that an optical signal may propagate in a guided fashion in such waveguide arrays. The optical signal propagating in such waveguide array is called "Floquet-Boch wave", or "supermode" or "Schrodinger discrete modes" depending on the authors. In the frame of the following application, this signal will be referred to as guidonic wave. The guidonic wave is defined by its guidonic wave vector and the components of this vector have a relationship thereamong, called diffraction relationship. For instance, in the frame of a simple theory of in-plane coupled modes, if $k_x$ and $k_z$ are the two components of the guidonic wave vector along directions X and Z, in reduced units $k_z$ is proportional to 2 cos $k_x$, the proportionality constant being equal to the coupling coefficient.

The optical signal processing in the array of coupled waveguides is particularly advantageous notably in the telecommunications field.

In such an array of coupled waveguides, in principle, the optical signal composed of a light beam propagates linearly, with a natural divergence which may be null.

Nevertheless, in particular, in the field of switch components for optical telecommunications, it would be advantageous that a light beam may be processed, and more particularly oriented, reflected or focused.

To this end, many solutions have been considered.

First, it is possible to output the light beam from the waveguide array, and to orient the beam by known mechanical means such as mirrors or diopters, or lenses.

Nevertheless, the drawback of this solution is that it has to be implemented outside the waveguide array, thus loosing the guiding of the light beam. Thus, the use of waveguide arrays is not very efficient in terms of integration. The invention particularly aims at remedying this drawback by providing a component allowing the processing of the signal within the array itself, so as to form an entirely optical component.

In order to statically deflect a beam in a waveguide array, it is known from publication "Approximate solution of Eigenmode Problems for coupled waveguide arrays", Richard R. A. Syms, IEEE Journal of Quantum Electronics, vol. QE 25, n° 5, pp. 525-532 (1987), a waveguide array comprising an area of parallel highly coupled waveguides and an area of parallel weakly coupled waveguides so as to allow a static deflection at the interface between both areas. Nevertheless, in this publication, the simple deflection of the beam propagating in the waveguide array is too much restricted to be able to apply it in industrial components.

The original approach forming the basis of this invention is to use such waveguide arrays to obtain an optical component of a new type, making it possible to process the signal within the array itself, so as to form an entirely optical component.

SUMMARY

The invention relates to an optical component comprising an array of coupled waveguides wherein the waveguide array comprises:

- a first area formed of parallel waveguides coupled according to a first coupling coefficient;
- a second area adjacent to the first area formed of parallel waveguides coupled according to a second coupling coefficient lower than the first coupling coefficient;
- a third area adjacent to the second area of parallel waveguides coupled according to a third coupling coefficient higher than the second coupling coefficient;
- a fourth area adjacent to the third area of parallel waveguides coupled according to a fourth coupling coefficient lower than the third coupling coefficient;
- a fifth area of parallel waveguides coupled according to a fifth coupling coefficient higher that the fourth coupling coefficient.

Owing to this configuration of the waveguide areas, an optical signal may be transmitted between the first area and the fifth area. Indeed, the second area and the fourth area, having low coupling coefficients, form a resonant tunnel effect type dual barrier around the third area having a high coupling coefficient. The presence of this resonant tunnel effect type dual barrier should normally impede the transmission of the incident wave, but may also promote it for some incidence directions. Indeed, the central area, that is, the third area, formed of weakly coupled waveguides, has a discrete set of eigen propagation constants along the guiding direction. With regard to the optical signal, this central area constitutes a relay area, that is, it mitigates, or even inhibits, the reflection on the barriers and promotes the transmission thereacross, when the resonance condition is satisfied, that is, when one of the eigen propagation constants of the central area is equal to the component of the wave propagation constant incident along the guiding direction. The incident wave propagation constant is the guidonic wave vector thereof and defines its propagation direction, that is, the incidence direction.

In other words, and in accordance with the terminology adopted in the present application, the central area, that is, the third area, formed of highly coupled waveguides, will be referred to as a channel. This channel is surrounded on either side by intermediary areas, that is, the weakly coupled second and fourth waveguide areas, which will be referred to as dikes. The channel is accessible from the first area only by light beams of selected incidence, bringing about a resonance effect about the resonance condition, and it then can transmit them towards the fifth area though the dikes, by means of an optical tunnel effect. As in any dual barrier device, the efficient functioning of this structure imposes constraints on the height and width of the barriers. The barrier height, for instance set by the ratio between the coupling coefficients of the channel and the dike, must be high enough to block the off-resonance propagation. For example, a value of 2 is correct, as shown by the guidonic diopter passage equations detailed below. Also, the input barrier width should be low enough so as the evanescent wave traversing it exhibits an amplitude high enough to sense the channel and set the resonance, and the same applies for the output barrier. This means that this width is about the range of the evanescent wave a close approximation of which would be $$L_{ev} = \frac{1}{\mathrm{Arg}ch\left(\frac{c_{channel}}{c_{dike}}\right)}.$$

With regard to the coupling coefficients given as an example above, a width of about one or two guides is correct. With regard to the channel, it is necessary to use a simulation to determine the width thereof in a way compatible with constraints of technology, according to the procedure described later on in the paragraph dedicated to a possible dimensioning of the component. Indeed, the component characteristics are very sensitive to the channel width.

The resonance condition introduces additional constraints with respect to the relative values of the coupling coefficients of the first and the third areas, on one hand, and the third and the fifth areas, on the other hand: the coupling coefficient of the first area and of the fifth area should be sufficiently high so that guidonic waves, whose guidonic wave vector component along the guiding direction is equal to or very close to one of the eigen propagation constants of the central area, may propagate in these areas.

When a high incident beam arrives towards the second area, thus traversing the first area, if its incidence is selected in the vicinity of the resonance condition, a light energy build-up in the channel occurs, that is, in the third central area. The modification of the power density in this area makes it possible to modify the propagation constant of the third area, for example, through an optical Kerr effect, which leads to the modification of the powers transmitted to and/or reflected on the channel and the following areas. The component may thus be used in a completely optical manner as a power limitation attenuator, or as a logical gate, such as NOT or XOR gate.

According to an embodiment of the invention, the central area, that is, the third area has a propagation constant and the optical component further comprises control means arranged to modify the propagation constant of the third area.

According to this embodiment of the invention, by modifying the propagation constant of the third area, the propagation of the signal traversing the channel is acted upon, so as to act upon the beam transmitted towards the fifth area. The transmission sensitivity to the control means is at a maximum in the vicinity of the resonance.

Hereafter, particular embodiments making it possible to achieve this propagation constant modification of the third area are described.

According to a first embodiment, the control means may comprise optical means arranged to vary the power density of at least one control light beam directed towards the third area. The control light beam may be transmitted from above or from underneath the component towards the third area.

More particularly, the optical means may be arranged such that the control beam is capable of propagating in the third area.

This embodiment advantageously uses the fact that a control beam may be confined and may propagate in the channel formed by the central third area surrounded by the dikes formed by the second and the fourth areas. This confinement, which is closely linked to the eigen propagation constants of the channel formed by the central area, is specifically described in the aforementioned Syms and al. publication. Thus, the modification of the power density of the control beam makes it possible to change the propagation constant of the third area, through an optical Kerr effect, for example, such that the resonance moves on the axes representing a component of the incidence direction. Thus, it is possible to act upon the transmission and/or reflection characteristics of an incident beam towards and/or on the channel and the following areas.

To this end, the power density of the incident beam is preferably selected so as to remain lower to that of the control beam of the interaction area between both beams, that is, in the central area corresponding to the third area.

The modification of the power density of the control beam thus causes a modification of the incident beam transmitted and reflected powers.

In this case, the optical component may be used as an adjustable n %/(100−n) % bidirectional coupler, the transmission rate n being adjustable depending on the control beam power. The component may also be used as a rotator, switch, or logical gate, particularly NOT or XOR gate.

Besides, when the control beam power is lower than the incident beam power, while having a higher power density, the component may be used as an optical transistor, which is the optical equivalent of a transistor.

According to another embodiment, in order to modify the propagation constant of the third area, the component may comprise electrical means arranged to generate an electric field in the third area. By varying this electric field, the propagation constant of the third area may be modified through an electro-optic effect, such as the Pockels effect, for example. Therefore, the electric field variation has the same effect on the propagation constant than the power density variation of a control beam.

For example, the electrical means may comprise electrodes deposited on the second and fourth areas.

When an electric voltage is applied between these electrodes, an electric field is generated within the central area forming the channel, that is, the third area.

Electrodes may further be placed on this central area to produce an electric field component perpendicular to the plane of the component in the central area.

DRAWINGS

Detailed embodiments of the invention are now described with reference to the accompanying drawings wherein.

DETAILED DESCRIPTION

In the figures, identical numerical references relate to similar technical elements.

According to the invention, an optical component comprises a waveguide array 1.

In a way known per se, for example in the aforementioned Syms and al. publication, a waveguide array 1 comprises parallel waveguides oriented along a guiding direction.

Figure 1:
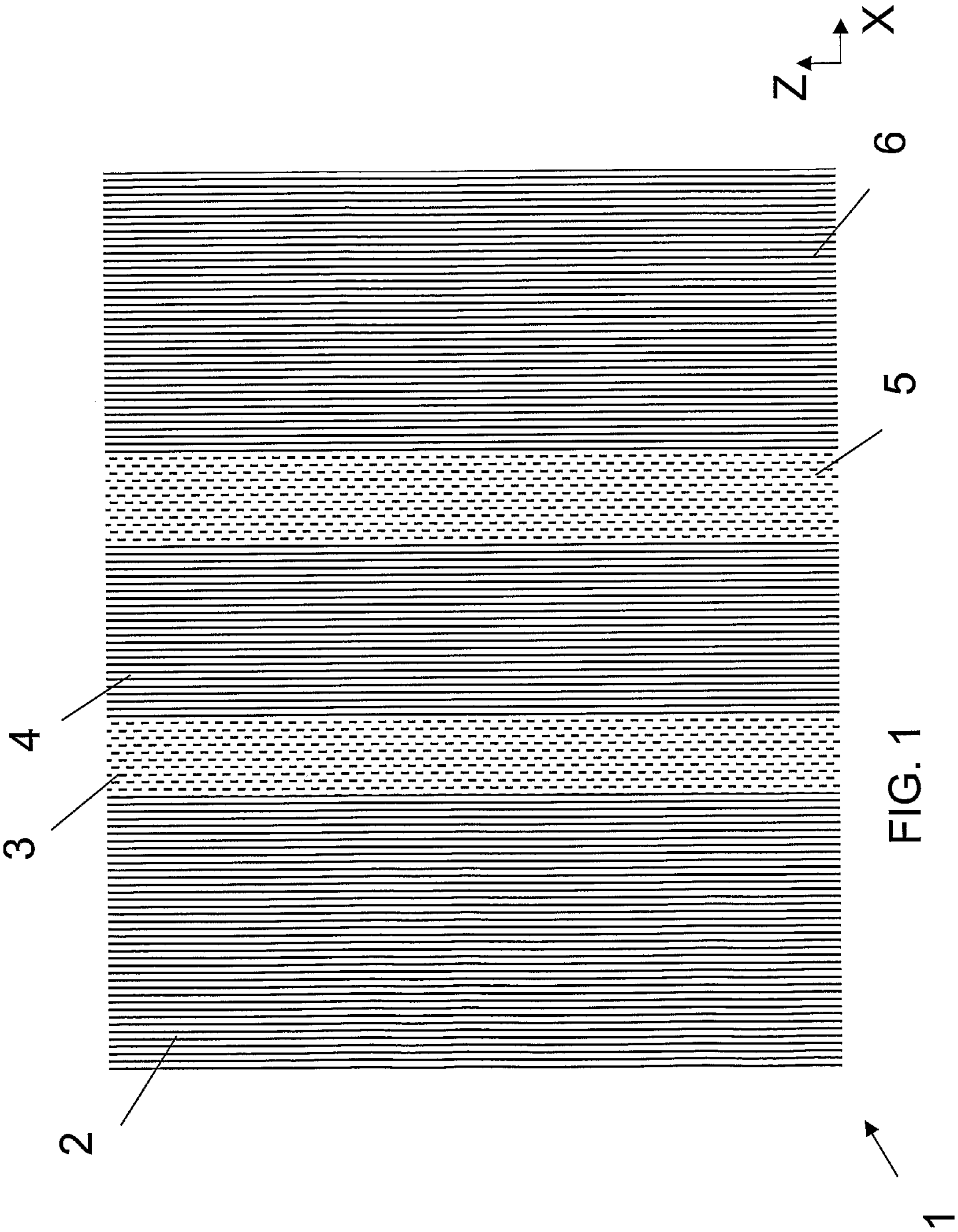
FIG. 1 illustrates a five-area waveguide array according to an embodiment of the invention.

On FIG. 1, the waveguide array 1 comprises parallel wave guides oriented along the guiding direction Z.

The waveguide array 1 comprises at least five areas denoted 2 to 6 characterized by particular coupling coefficients uniform within each area. Nevertheless, the coupling coefficient varies when passing from a first area to an area adjacent thereto. The coupling coefficient is for example determined by the gap between the guides in each area, and, the more the guides are tightened within one area, the higher the coupling coefficient will be in that area. It may also be determined by the geometry or the space index between the waveguides.

The central area 4 comprises parallel coupled waveguides oriented along the guiding direction Z. In this central area 4, the waveguides are coupled according to a high coupling coefficient.

Two median areas 3 and 5 are disposed on either side of the central area 4 and each comprises parallel coupled waveguides oriented along the guiding direction Z. the waveguides are coupled according to a low coupling coefficient, that is, according to a coupling coefficient lower than the coupling coefficient of the central area 4. The coupling coefficients of areas 3 and 5 waveguides are for example equal, but they may be different while remaining lower than the coupling coefficient of the waveguides of median area 4.

Median areas 3 and 5 are adjacent to the central area 4 and the respective interfaces between the median areas 3 and 5, and the central area 4 are preferably parallel along the guiding direction.

The waveguide array further comprises an area 2 adjacent to median area 3 and the interface between area 2 and median area 3 is preferably parallel to the guiding direction.

Likewise, the waveguide array further comprises an area 6 adjacent to median area 5 and the interface between area 6 and median area 5 is preferably parallel to the guiding direction.

The coupling coefficient of the waveguides of area 2 is higher than the coupling coefficient of the waveguides of adjacent median area 3.

Likewise, the coupling coefficient of the waveguides of area 6 is higher than the coupling coefficient of the waveguides of adjacent median area 5.

In other words, the parallel wave guides of area 2 are more strongly coupled than parallel waveguides of area 3, and parallel waveguides of area 6 are more strongly coupled than parallel waveguides of area 5.

The coupling coefficients of areas 3 and 5 waveguides may be equal for the sake of manufacturing simplicity, but this equality is not necessary for the functioning efficiency of the component. Likewise, the coupling coefficients of waveguides of areas 2 and 6 may be equal to the coupling coefficient of central area 4 waveguides for the sake of a greater simplicity.

In other words, on FIG. 1, the waveguide array 1 comprises five successive strips formed of parallel waveguides all being oriented along the guiding direction.

An optical signal may propagate in a guided manner in such a waveguide array. Thus, in such an array of coupled waveguides, the propagation is not only an individual propagation in the guiding direction of the waveguides, but also a free collective propagation. Here, the beam resulting from a free collective propagation of a guidonic wave superposition is called “guidonic beam”.

As will be described in more detail later on, the particular configuration of the strips according to the invention makes it possible to act upon the propagation of this guidonic beam.

Figure 2:
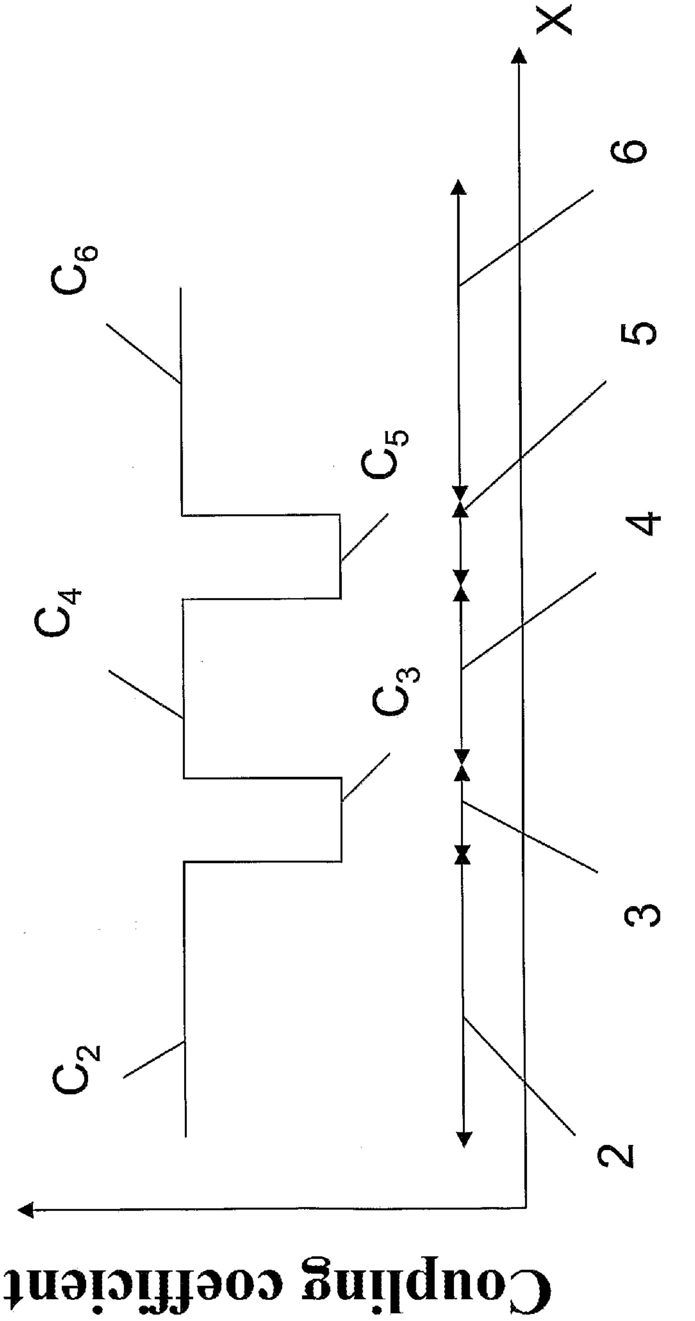
FIG. 2 represents the variation of the coupling coefficients in the waveguide array illustrated in FIG. 1.

FIG. 2 represents the variation of the coupling coefficients in the waveguide array 1 as a function of the various strips 2 to 6 of array 1 in the X direction perpendicular to the guiding direction, in a particular case in which the coupling coefficients are equal in strips 3 and 5, on one hand, and strips 2, 4 and 6 on the other hand.

It is to be understood that a strong coupling between the waveguides facilitates the propagation of a light beam between the waveguides while a weak coupling limits this propagation. If necessary, when the waveguides are no longer coupled, the propagation effect between the waveguides disappears.

Therefore, median areas 3 and 5 may be regarded as a dual barrier, or a double dike, surrounding the central area 4, which may be considered as a channel.

Analogically to a “resonant tunnel” type effect, the presence of a dual barrier formed by median areas 3 and 5 exhibiting a weak coupling coefficient allows the transmission of a light beam between transmission areas 2 and 6 when the propagation of this beam resonates with the eigen propagation of the central area 4. In guidonic optics, the resonance condition is expressed in terms of propagation direction. A beam propagating in area 2, incident on the first barrier formed by area 3, may then be partially transmitted to area 6 if it has a convenient incidence direction. In other words, this beam may traverse the dual barrier formed by median areas 3 and 5 surrounding the central area 4.

On the contrary, the absence of central area 4, therefore, in the absence of resonance, it would not be possible with a single barrier to obtain this effect analogous to the resonant tunnel effect.

Numerous embodiments of the waveguide strips described here above are possible, such as, for example, epitaxy and etching in the GaAs/GaAiAs system, or the diffusion in a silica-based system. These methods are well known by a man skilled in the art.

In order to design the individual waveguides, the skilled person may use many methods known per se. More particularly, he/she may use the so-called “shallow ridge” structure in semiconductors III-V obtained through chemical etching of a stack made from MOCVD in an InP/InGaAs system. An example is described in more detail in publication “Diffraction management”, H. S. Eisenberg, Y. Silverberg, R. Morandotti, and J. S. Aitchison, Physical Review Letters, vol. 85/9, pp 1863-1866 (2000). With regard to this particular structure, designed to function at 1.55 μm, the coupling coefficient is of $0.15\ mm^{-1}$.

The variation of the inter-guides coupling from a strip to another may be achieved by varying the spacing between the waveguides or by varying the geometry or the index of the inter-guides areas. More specifically, for example, varying the coupling coefficient is obtained by varying the distance d between the waveguides in the direction perpendicular to the guiding direction and, if necessary, in the guiding direction if obtaining oblique or curved interfaces between the various areas is desired. Thus, a function C(d) corresponding to the coupling coefficient between two waveguides as a function of the distance between the waveguides is defined.

This coupling coefficient depends on the overlay of the individual guide modes. This mode overlay having a quasi exponential shape, therefore, the function C(d) also decreases quasi-exponentially. Therefore, it is possible to obtain strong variations of the coupling coefficient with a weak variation of the distance between the waveguides. To achieve these variations, it is also possible, in all the embodiments, to dig grooves between the waveguides according to patterns defined by an etching mask reproducing a hetero-structure of guide arrays having different coupling coefficients, such as defined by the different areas upon designing. In this case, the locally weaker the coupling coefficient is desired to be, the deeper the etching should be. The required calculation of the etching for obtaining the desired coefficients may be made through numerical simulation known per se called "Beam Propagation Method". In a manner also known per se, after etching, tests are made in order to verify that the array corresponds to the desired structure.

The optical component of the invention is now described in operation.

The association of two strips of parallel waveguides coupled with different coupling coefficients modifies the propagation constant of a guidonic wave and thus the propagation direction of the wave upon traversing the interface thereof. This modification of the propagation direction is for example described in the aforementioned Syms. And al., publication in the case where the coupling coefficient varies between two strips in the direction perpendicular to the guiding direction and is constant in the guiding direction.

Also, the coupling coefficient may vary in the guiding direction, such that the interface between two areas of coupled waveguides exhibiting different coupling coefficients may be oblique or curved as described in more detail in the non published application N° PCT/FR2008/000628.

Figure 3:
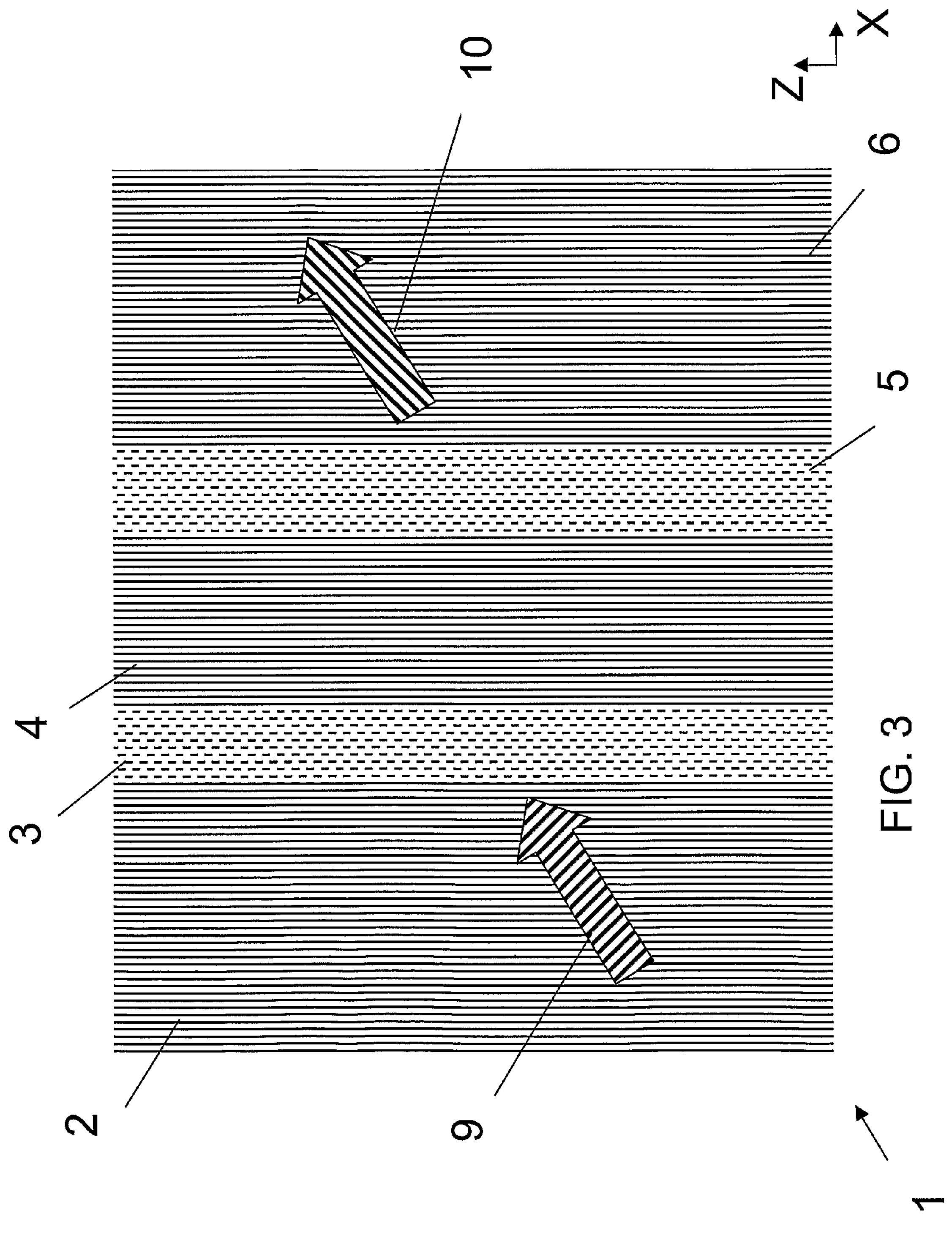
FIG. 3 represents the waveguide array of FIG. 1 in which a guidonic beam is processed.

As illustrated in FIG. 3, central area 4 defines a privileged mode of propagation constant $K_M$. When a guidonic beam 9 propagating in the input area 2 is incident towards median area 3 adjacent to the central area 4 with a propagation constant component along the guiding direction equal to or close to $K_M$, the guidonic beam 9 may be transmitted towards the output area 6 through a resonant tunnel type effect in the form of a transmitted guidonic beam 10. Part of the guidonic beam 9 energy accumulates in the central area 4, which brings about the modification of the transmitted beam power when traversing central area 4. The component then forms a power attenuator.

Figure 5:
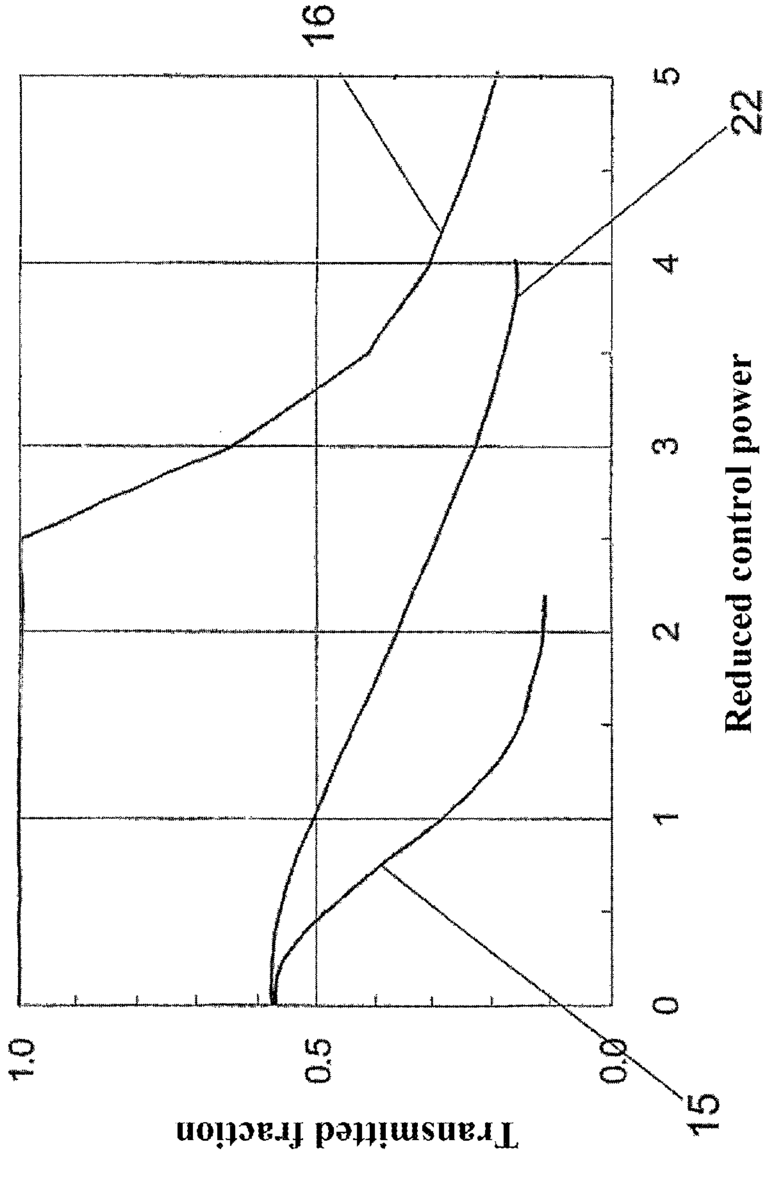
FIG. 5 represents the fraction of the incident beam transmitted by the structure shown in FIG. 4 as a function of the control beam power, as well as this function for a related art device.

Thus, the transmitted fraction of a guidonic beam may vary quasi linearly with the intensity of the control beam, with no threshold effect as in the reference non linear optical device described, for example, in publication: "Incoherent blocker solution interactions in Kerr waveguide arrays", J. Meier et al., Optics Letters, vol. 30, N° 23, pp. 3174-3176 (2005). FIG. 5 illustrates the transmitted power fraction as a function of the control beam power, in this case the power of the incident beam 9 itself, expressed on a waveguide array guide basis. Curve 22 represents an example of the variation in component 1 according to the invention while curve 16 represents the variation in a component according to the related art. It is easily understood that the absence of a threshold effect in the component according to the invention is very advantageous in practice so as to extend the operating range.

Figure 4:
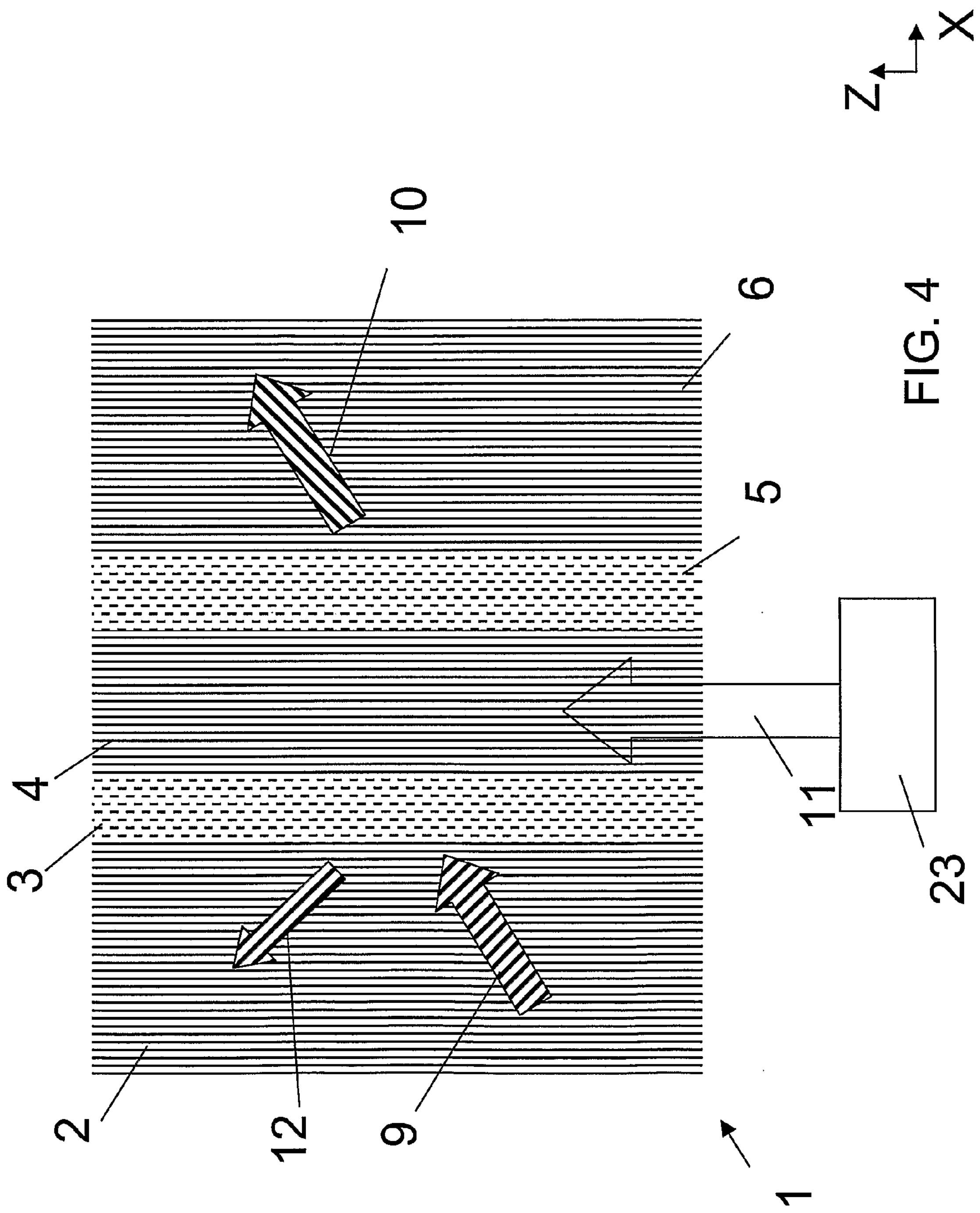
FIG. 4 represents an embodiment of the waveguide array of FIG. 1 with a control beam confined in the central area.

As illustrated in FIG. 4, the transmitted beam 10 power may be adjusted by means of a control beam 11 emitted for example by a laser 23. The control beam 11 is transmitted towards central area 4 for example in the guiding direction Z corresponding to the direction of the interfaces between central area 4 and, the median areas 3 and 5, respectively.

As mentioned above, the median areas 3 and 5 having a low coupling coefficient form a barrier for control beam 11, such that the beam is confined in the central area 4 and propagates in central area 4 in the form of a guidonic wave in the guiding direction Z.

Laser 23 may also be arranged such that the control light beam 11 is directed towards central area 4 from above or underneath component 1.

With the optical Kerr effect, a modification of the power density of the control beam 11 by laser 23 changes the optical index and thus, the propagation constant $K_M$ in the central area 4, which modifies the transmission features of this central area 4.

Thus, when a guidonic beam 9 is incident towards central area 4, a modification of the power density of the control beam 11 brings about a modification of the transmitted beam 11 and reflected beam 12 power. This transmitted and reflected power modification phenomenon particularly occurs when the power density of the incident beam 9 is lower than the power density of the control beam 11.

The optical component may then form an adjustable n %/(100−n) % bidirectional coupler, the transmission percent being optically controlled by the power density of the control beam 11.

Very advantageously, the transmitted fraction of a guidonic beam varies quasi linearly with the intensity of the control beam, with no threshold effect as in the reference device, also capable of operating as a coupler, a switch or a router. FIG. 5 illustrates the transmitted power fraction as a function of the control beam power, in this case the control beam 11, expressed on a waveguide array guide basis. Curve 15 represents an example of variation in a component 1 according to the invention whereas curve 16 represents the variation in a component according to the related art. It is easily understood that the absence of a threshold effect in the component according to the invention is very advantageous in practice.

Besides, in the particular case where the control beam 11 power is lower than the incident signal beam 9 power, which is not incompatible with the condition on power densities, then, it is possible to have an effect similar to that of a transistor, called optical transistor.

For example, if $P_{incident}$ is the power of the incident beam 9, similar to an emitter current of a transistor, $P_{emitted}=\alpha\times P_{incident}$ with $\alpha<1$, $\alpha$ close to the unit, may be considered as the power $P_{collector}$, taken on a collector, similar to a collector current of a transistor, with a power on the control port $P_{control}$ (control beam 11 power), similar to a transistor base current. If $P_{emitted}=\beta\times P_{control}$, then an optical transistor of which optical power gain $\beta>1$ is obtained, an optical analog of a transistor of which current gain is $\beta$.

Also, many control beams 11 may be confined in channel 4, in a co-propagation or backward-propagation configuration, or simply directed on the channel 4 region traversed by the signal beam, for example, from above or underneath the component, or further according to any combination of either methods.

Figure 6:
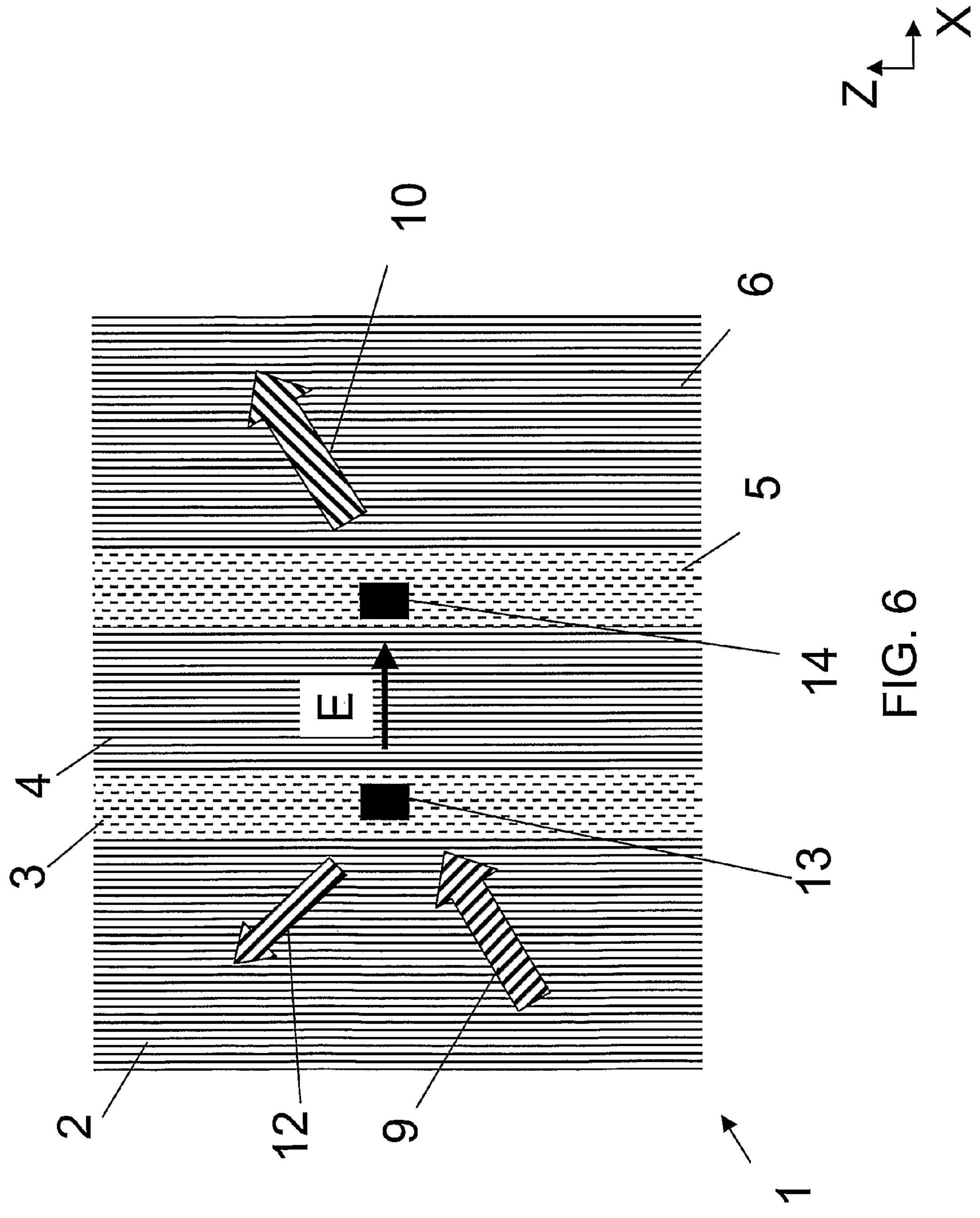
FIG. 6 represents an embodiment of the waveguide array of FIG. 1 with electrical means.

As illustrated in FIG. 6, according to another embodiment of the invention, electrodes 13 and 14 are positioned on median areas 3 and 5. These electrodes 13 and 14 may receive a variable voltage so as to generate an electric field E perpendicular to the guiding direction of variable amplitude. Through an electro-optic Kerr effect or Pockels effect, the variation of this electric field induces a variation of the propagation constant in the central area. Thus, the electric field E variation has the same effects than that of the power variation of an optical control beam such as beam 11 and therefore makes it possible to obtain a threshold free coupler illustrated in FIG. 4.

Likewise, the propagation constant in the channel formed by area 4 may be modulated by other means, for example, depending on temperature, on a mechanical restriction, on a deposition/evaporation cycle, a fluid flow, on the presence of biological objects or chemical species.

Another embodiment of the invention is now described with reference to FIG. 7. On FIG. 7, component 1 further comprises two end areas 7 and 8 respectively adjacent to areas and 6. These end areas 7 and 8 also comprise waveguides parallel coupled in the guiding direction Z. the coupling coefficient of the parallel coupled waveguides of the end area 7 is different from the coupling coefficient of the parallel coupled waveguides of area 2, and is, for instance, higher thereto. Also, the coupling coefficient of the parallel coupled waveguides of the end area 8 is different from the coupling coefficient of the parallel coupled waveguides of area 5, and is, for instance, higher thereto.

The function of area 7 particularly consists in adjusting the incidence of an incident guidonic wave 9 towards the central area 4. Indeed, when traversing the interface between area 7 and area 2, an entry guidonic wave 17 is diverted owing to the coupling difference between the guides of area 7 and the guides of area 2. The ratio between the coupling coefficients of guides of area 7 and guides of area 2 is then selected such that the incident wave 9 has an incident direction allowing a transmission when passing through the dual barrier formed by the low coupling areas 3 and 5. Obviously, the reflected wave 12 is also diverted in a reflected diverted beam 18 which may also be used at the component 1 output.

Also, the function of area 8 consists in adjusting the incidence of the transmitted beam 10, more particularly so as a diverted beam 18 is adapted at the component 1 output.

The above described embodiments aimed at varying the transmission characteristics of channel 4 by changing the propagation constant thereof may obviously be used with such a seven-strip array rather than a five-strip array.

Figure 7:
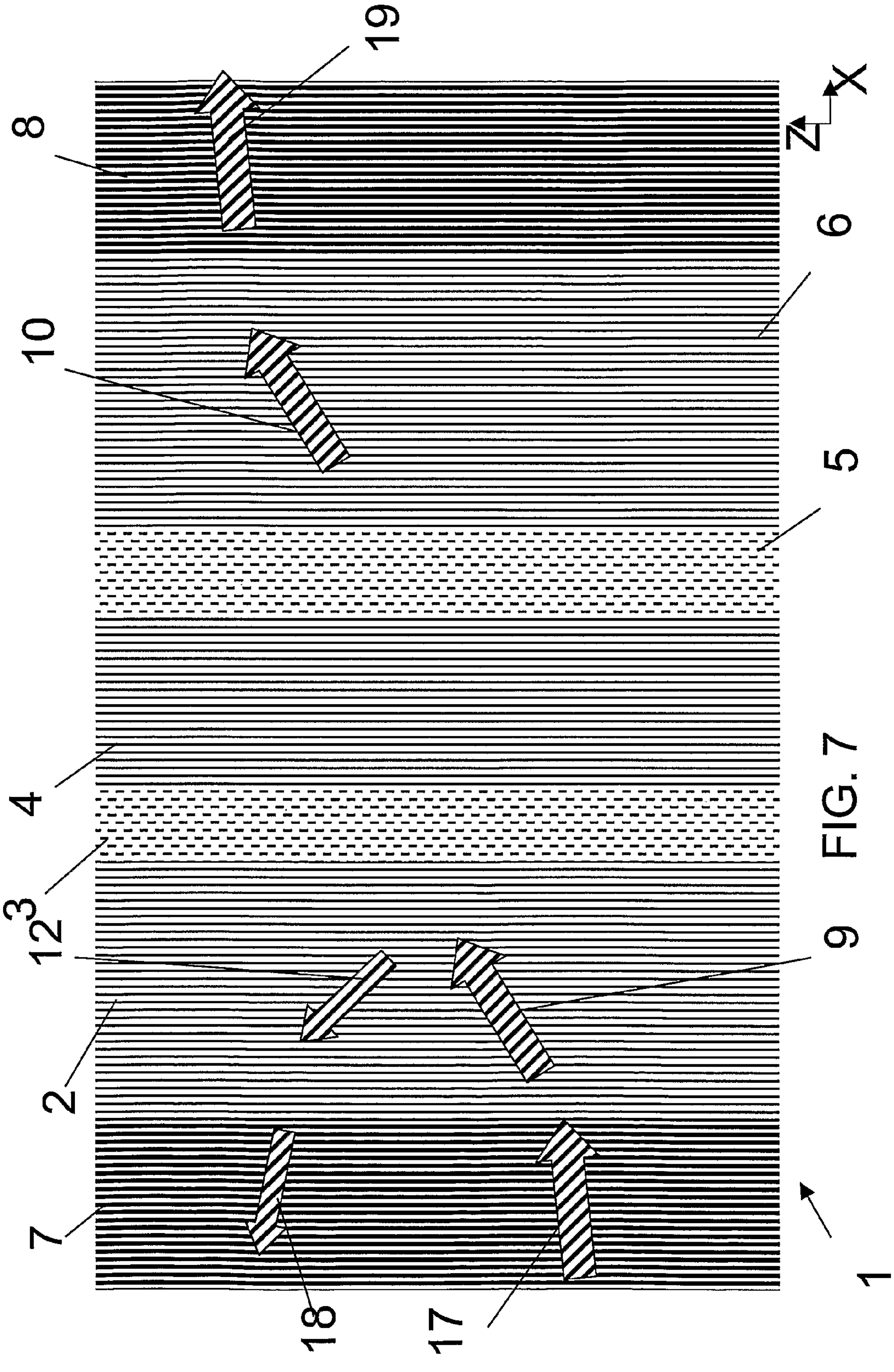
FIG. 7 illustrates a seven-area waveguide array according to another embodiment of the invention.

An Exemplary dimension that may be considered for the component illustrated in FIG. 7 is now mentioned. In a simple case, input and output beams are considered to have a given direction and considered to propagate in given inter-guides coupling areas 7 and 8. The design of the device consists in inserting between these areas the dual barrier structure optimized for the sought function. Area x width is denoted as $L_x$, expressed as a number of guides, and $C_X$ denotes the inter-guides coupling in this area. The incident direction in area 7 is defined by $k_{x7}$, its wave vector along X in reduced units inversely to the spacing between guides in this area.

The choice of the widths and inter-guide couplings of each area may thus be made as follows, using adapted simulation means, for example, relying on the coupled modes theory, and a mix of a numerical simulation from raw equations, of computation of the eigen modes of the active structure, and applying the various guidonic laws which will be described in more detail later:

For instance, for the sake of simplicity, $C_3=C_5=C_d$, $C_2=C_4=C_6=C_c$ and $L_3=L_5=L_d$, The values of $C_d/C_c$ (height of the crossing obstacle barrier), of $L_d$ (dike width), and of $L_4=L_c$ (channel width), as well as the component along X of the incident wave vector on the dual barrier, $k_{x2}$, are optimized in order to maximize the sought performance, for example, the slope of the reflectivity curve as a function of the incidence. For example, it is possible to adopt $C_d/C_c=0.5$, $L_d=1$, $L_c=6$, $k_{x2}=0.48$ (in units reduced inversely to the spacing between the guides, taken as a constant all over the structure).

$L_2$ and $L_6$, $L_7$ and $L_8$ are selected so as to be larger along direction X than the beam width traversing them, (beam 17 for area 7), for example, with $L_2=L_6$ and $L_7=L_8$.

Once these choices made, since $C_7$ and $k_{x7}$ are given, all the values are determined, in the case given as an example, thanks to the relation $C_7 \cos k_{x7}=C_2 \cos k_{x2}$ which sets $C_2=C_c$, the last unknown.

The operation is obtained by injecting for example a beam of waist front-sights, of 20 guides, to 30 guides of the centre of the structure, by performing the detection of the reflected and transmitted signals at a given propagation distance, for example, a propagation over $46/C_4$.

Curve 15 of the fraction transmitted as a function of the control power is illustrated in FIG. 5. The power scale of the ratio between the effective power of the control beam 11, expressed on a waveguide array guide basis, and the critical power of the component (non linear index effect appearance power). This critical power equals $C_4/$, where is the non linear coefficient of a unique guide, which depends on its size and the Kerr susceptibility of the material of the core thereof.

The refraction laws for a guidonic wave propagating through a guide array particularly I order to determine the coupling coefficients to be used depending on the beam incidence angles are described in more detail below.

With regard to a simple case of unidimensional structuration, as between areas 7 and 2 of FIG. 7, the interface between both areas of parallel waveguide coupled with different coupling coefficients forms a diopter. In order to perform the calculations, the bands are supposed to be semi-infinite on either side of the interface.

$C.c_1$ denotes the coupling coefficient of the first band of guides, for example, area 7, and $C.c_2$ the coupling coefficient of the second band of guides adjacent to the first band, C being the coupling common reference.

The passage of a vector wave of guidonic wave ($K_x$, $K_z$) in this geometry is ruled by the conversion of $K_z$, that is, $K_{z1}=K_{z2}$, which, owing to the usual diffraction relations implies $-2\, c_1 \cos K_{x1}=-2\, c_2 \cos k_{x2}$.

Figure 8:
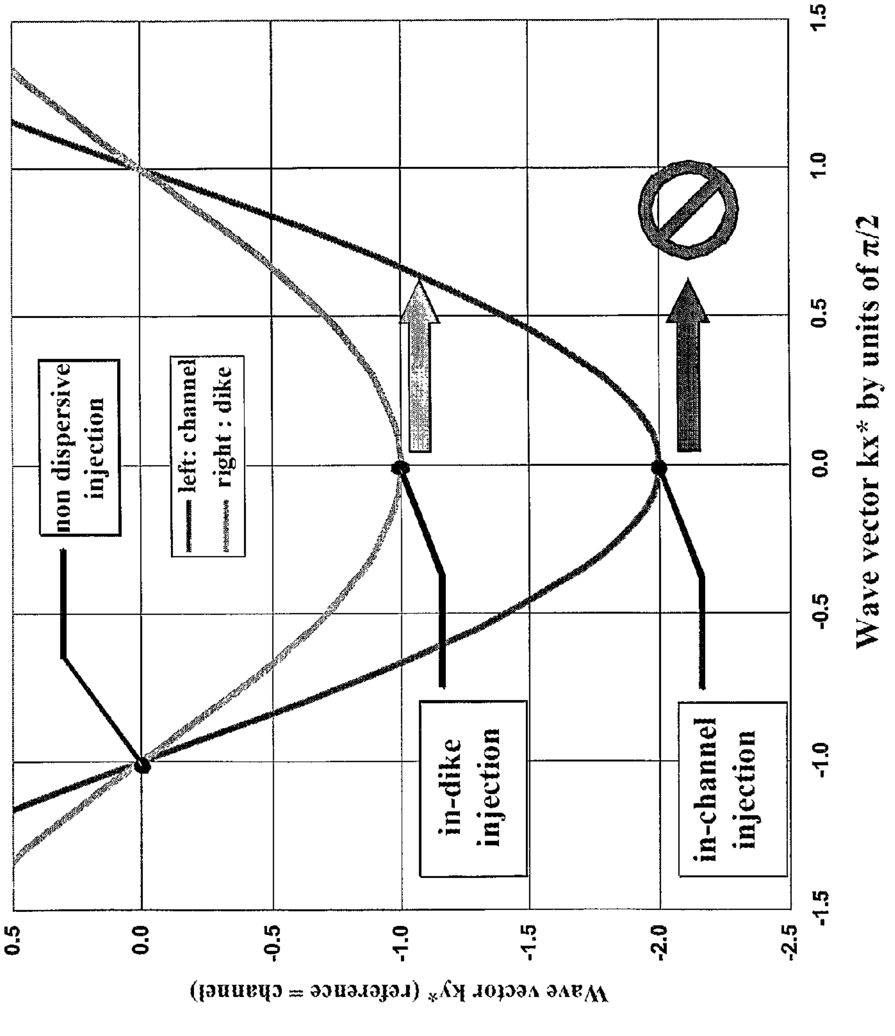
FIG. 8 represents a graphical construction of the solutions for the passage of a vertical diopter within a waveguide array.

These two equations show the wave vector change and thus the inclination of the wave front at the passage. These equations may be resolved in a graphical manner considering horizontal transitions among diffraction curves $k_z(k_x)$ as illustrated on FIG. 8. On this figure, it has been considered that the first band is a channel and the second band a dike, such that $c_1>c_2$. A specular reflection is always possible, as well as a refraction in accordance with modalities close to that of the photon (critical angle, etc.).

Contrary to the photon, with respect to a guidonic wave, the energy direction change obeys to another law than the wave vector direction change.

This law, the equivalent of the Snell-Descartes relation front-sight, is the combination of the passage law of the wave vector and to that which rules the ratio between the wave vector direction and the propagation direction of energy in both media.

$$\left(\frac{\Delta x}{\Delta z}\right)_1 = -\frac{\partial k_{z1}}{\partial k_{x1}} = -2\sin(k_{x1})$$

$$\left(\frac{\Delta x}{\Delta z}\right)_2 = -\frac{\partial k_{z2}}{\partial k_{x2}} = -2\sin(k_{x2})$$

$$-2c_1\cos k_{x1} = -2c_2\cos k_{x2}$$

$$\left(\frac{\Delta x}{\Delta z}\right)_2 = -2\sin\left(\mathrm{Arccos}\left(\frac{c_1}{c_2}\cos\left(\mathrm{Arcsin}\left(-\frac{1}{2}\left(\frac{\Delta x}{\Delta z}\right)_1\right)\right)\right)\right)$$

With regard to an oblique diopter, that is, if the interface between two bands is not parallel to the guiding direction, it is also possible to determine the refraction law of the guidinic wave by means of the conservation equation. For example, with regard to an oblique interface defined by its normal vector $\vec{q}$, the conservation rule is expressed as follows:

$$\Delta\vec{k}\alpha\vec{q}$$

The use of the component according to the invention in order to achieve all-optical logical gates is now described.

The obtaining of all-optical logical gates is made by changing the input and output matching of component 1, that is, by adjusting contrast ration $C_7/C_2$ which will determine the incidence $k_z$ in the central area 4.

Figure 9:
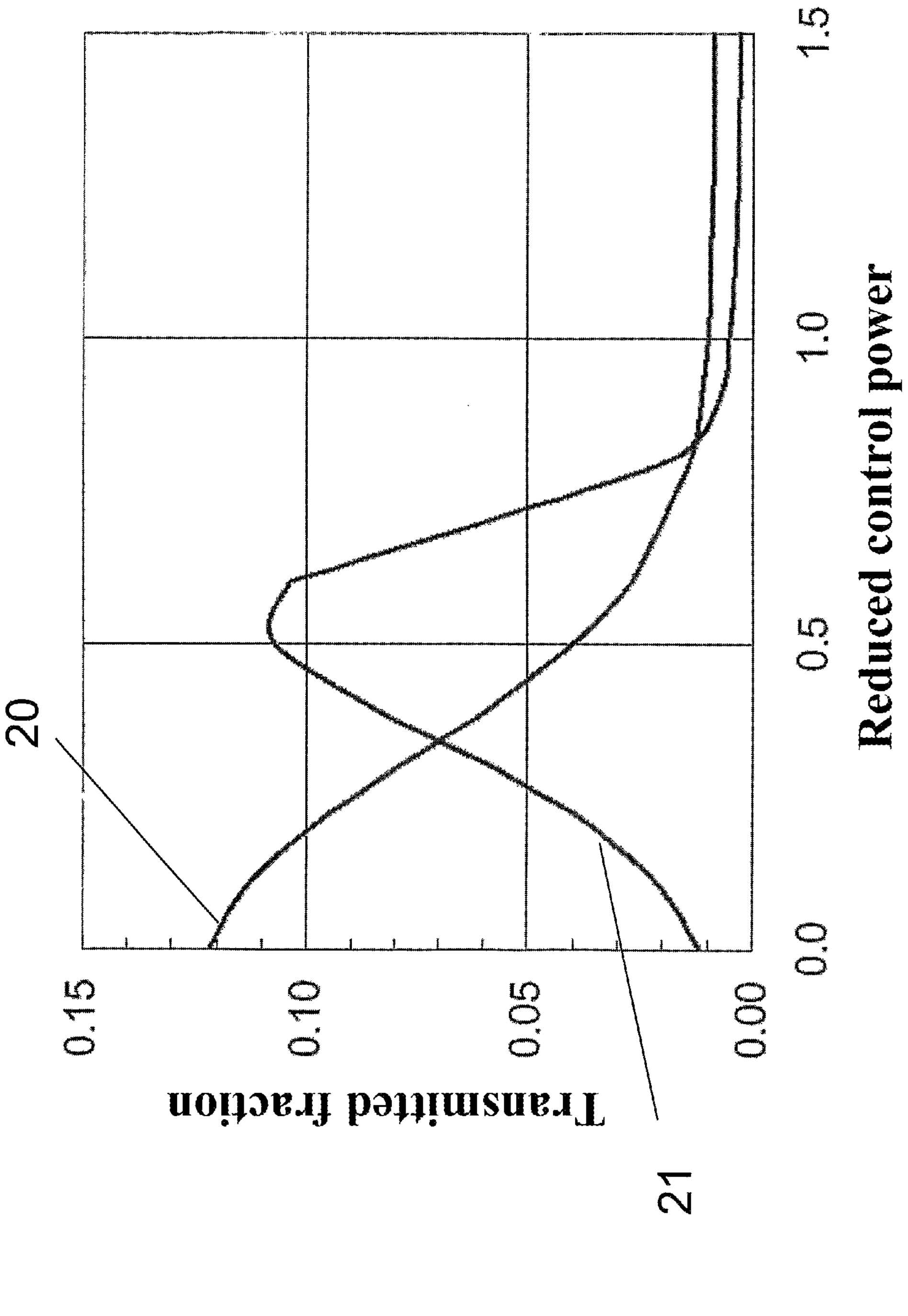
FIG. 9 illustrates two examples of all-optical logical functions obtained thanks to a component according to the invention.

FIG. 9 illustrates two examples of all-optical logical functions.

Curve 20 represents a transfer function obtained by means of a component according to the invention in which the values given above with regard to the design of the dual barrier have for example been selected, further setting $C_2=C_7=C_8$, $k_{x2}=0.23$, and a propagation on $128/C_4$. This function is a reverse function, or NOT gate, in which the transmitted intensity is high when the control beam 11 is weak, and the transmitted intensity is weak when the control beam 11 is high.

Curve 21 represents a transfer function obtained by means of another component according to the invention with the same structure that above, but with $k_{x2}=0.15$ and a propagation over $128/C_4$. This function is a XOR type function, obtained by means of two control beams 11. The transmission of the incident beam 9 is only important when one of the control beams is present. It is weak when neither one is present or when both are present and their intensities accumulate.

What is claimed is:

1. An optical component comprising an array of coupled waveguides, the waveguide array comprising:

a first area formed of parallel waveguides coupled according to a first coupling coefficient;

a second area adjacent to the first area formed of parallel waveguides coupled according to a second coupling coefficient lower than the first coupling coefficient, a third area adjacent to the second area formed of parallel waveguides coupled according to a third coupling coefficient higher than the second coupling coefficient, a fourth area adjacent to the third area formed of parallel waveguides coupled according to a fourth coupling coefficient lower than the third coupling coefficient;

a fifth area adjacent to the fourth area formed of parallel waveguides coupled according to a fifth coupling coefficient higher than the fourth coupling coefficient.

2. The optical component according to claim 1, wherein the interface between the second area and the third area is parallel to the interface between the third area and the fourth area.

3. The optical component according to claim 1, wherein the third area has at least a discrete propagation constant, and wherein the optical component further comprises control means arranged so as to modify the propagation constant of the third area.

4. The optical component according to claim 3, wherein the control means comprise optical means arranged to vary the power density of at least one control light beam directed towards the third area.

5. The optical component according to claim 4, wherein the optical means are arranged such that the control light beam is capable of propagating in the third area.

6. The optical component according to claim 3, wherein the control means comprise electrical means arranged to modify the propagation constant of the third area through an electro-optic effect.

7. The optical component according claim 1, further comprising a sixth area of parallel coupled waveguides adjacent to the first area.

8. The optical component according to claim 7, wherein the parallel waveguides of the sixth area are coupled according to a sixth coupling coefficient, the ratio between the sixth coupling coefficient and the first coupling coefficient being such that a beam propagating in the sixth area is diverted towards the second area and is capable of propagating to the fifth area.

9. The optical component according claim 1, further comprising a seventh area of parallel coupled waveguides adjacent to the fifth area.

* * * * *